United States Patent [19]

Miyatake

[11] Patent Number: 4,566,567
[45] Date of Patent: Jan. 28, 1986

[54] OVERRUNNING ROLLER CLUTCH

[75] Inventor: Kiyoshi Miyatake, Osaka, Japan

[73] Assignee: Koyo Seiko Company Limited, Osaka, Japan

[21] Appl. No.: 542,251

[22] Filed: Oct. 12, 1983

[30] Foreign Application Priority Data

Oct. 26, 1982 [JP] Japan .......................... 57-162894[U]

[51] Int. Cl.$^4$ ............................................. F16D 3/34
[52] U.S. Cl. .................................. 192/45; 188/82.84; 267/163
[58] Field of Search ................. 192/45, 44; 188/82.84; 267/158, 163, 164

[56]  References Cited

U.S. PATENT DOCUMENTS

| | | | |
|---|---|---|---|
| 3,134,471 | 5/1964 | Croswhite | 192/45 X |
| 3,241,641 | 3/1966 | Cowles | 192/45 |
| 3,339,687 | 9/1967 | Cowles | 192/45 |
| 3,404,760 | 10/1968 | Benson et al. | 192/45 |
| 3,537,555 | 11/1970 | Reister | 192/45 |
| 3,731,774 | 5/1973 | Kitchin | 192/45 |
| 3,877,555 | 4/1975 | Rist | 192/45 |
| 3,917,036 | 11/1975 | Johnson et al. | 192/45 |
| 3,990,555 | 11/1976 | Carullo | 192/45 |
| 4,106,602 | 8/1978 | Dieckermann | 192/45 |
| 4,230,211 | 10/1980 | Goto et al. | 192/44 X |

Primary Examiner—William E. Tapolcai
Attorney, Agent, or Firm—Mason, Fenwick & Lawrence

[57] ABSTRACT

Of a plurality of column portions and annular portions on both sides thereof comprising a roller cage, at least one of the annular portions is molded separate from the column portions, the column and annular portions are provided therein projections and mating recesses in the opposing faces and these are fitted together for secure joining thereof, and lugs formed at both ends of the spring element for urging rollers, which is divided into a plurality of segments along the periphery of the cage, are bent into radial grooves and a stepped recess portion for engagement therein.

10 Claims, 15 Drawing Figures

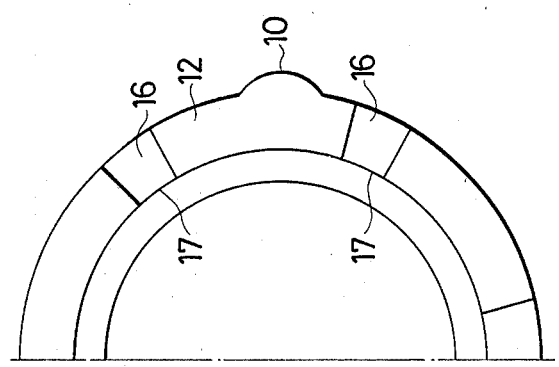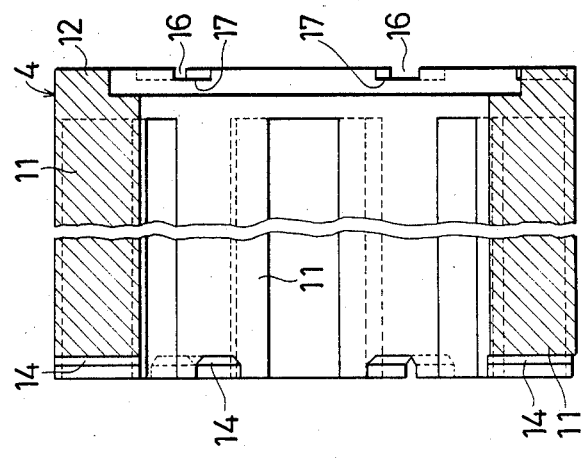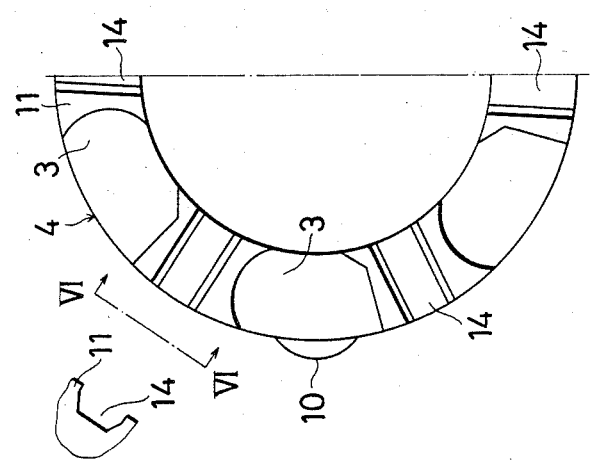

OVERRUNNING ROLLER CLUTCH

The following publications are of interest in connection with the subject matter of the present application.
A. U.S. Pat. No. 3,404,760, patented on Oct. 8, 1968.
B. U.S. Pat. No. 3,537,555, patented on Nov. 3, 1970.

The prior art A relates to what may be called an overrunning roller clutch made up of a cage 18 and spring elements 26 for urging rollers in an integral structure, in which the cage 18 is made of steel plate, the spring element 26 for urging rollers against camming surfaces of outer race is formed by stamping it integral with the cage 18 and the spring member 26 so formed is bent in the direction of urging. With this type of cage, however, it is necessary to increase the thickness of the material steel plate in order to make it strong enough, whereas it results in an increased weight of the cage 18 and a too high elasticity of the spring element 26. When, conversely, the plate thickness is reduced in order to reduce the spring force, the weight of the cage 18 is reduced indeed, but it is at the cost of marked lowering of its strength.

The other prior art B relates to what consists of sheet spring elements 6 attached to the inside of a cage 4. In it the spring elements 6 are arranged continuously and overlappingly along the entire inner periphery of the cage 4 and in practice their precise assembly with the cage 4 is difficult. Moreover, it is also necessary to bend tongue members for grip rollers 3 so as to project through openings 5 in the cage 4 and finish them to the desired shape, and the highly troublesome nature of the work adds a great deal to its manufacturing cost.

BACKGROUND OF THE INVENTION

With the conventional cage for grip rollers in an overrunning roller clutch of this type the configuration of roller pocket and the construction of spring element are highly complicated. Hence, it is difficult to form integrally the column portions and the annular portions at both axial ends of the cage, and there is a drawback of various processings being required after primary forming. When the cage is to be made of a synthetic resin for weight-saving, one-shot integral molding is difficult when its construction is complicated.

For the desired facilitation of molding it is considered possible to make one annular portion separately and join it to the end faces of the column portions molded integrally with the other annular portion to complete the cage. Such a synthetic resin part, when it is taken out of the mold after molding, tends to have its column portions inclined inward or twisted due to the internal stress. Since the column portions determine the width of the roller pocket and account for the parallelism of the pocket's shape, deformation or strain of the column portions is bound to seriously affect the roller pocket's geometrical precision. This tendency is still more marked with overrunning roller clutches, with which the thickness or sectional form of any of their component parts cannot be increased freely, e.g. those for machines or equipments whose shaft diameter is approximately 10 mm.

SUMMARY OF THE INVENTION

The present invention relates to an overrunning roller clutch using grip rollers, and more particularly to an overrunning roller clutch in which a synthetic resin cage is assembled with spring elements.

In the overrunning roller clutch of the present invention a roller is retained in each roller pocket of the cage, which is formed by the cage's column portions and annular portions at both ends thereof, the cage has attached thereto spring elements for urging the rollers against the corresponding camming surfaces provided in the outer race and there is provided an engaging means for engaging the outer race with the cage in the direction of rotation, and it is characterized in that one annular portion of the cage is formed separate from its column portions, there are provided mating projections and recesses in the end faces of the column portions and those of the annular portion to be joined thereto, the projection is fitted in the mating recess for joining the column portion with the annular portion, there are provided a plurality of radial grooves in the external end face of each of both annular portions and the bent lugs provided at both ends of each spring element are engaged in the above-mentioned grooves to thereby secure the spring elements to the cage.

It is an object of the present invention to facilitate molding and further distinctly improve the assembling precision of a cage of overrunning roller clutch which is made by assembling the above-mentioned cage of synthetic resin with spring elements.

Another object of the present invention is to facilitate and improve the efficiency of assembling spring elements so as to provide midget overrunning roller clutch of high precision at a low cost.

Further objects and features of the present invention will be apparent from the detailed description of the preferred embodiments below.

BRIEF DESCRIPTION OF THE DRAWINGS

In the accompanying drawings, in which preferred embodiments of the present invention are shown;

FIG. 4 is a sectional view showing principal parts of the cage, FIG. 5 is a left side view corresponding to FIG. 4, FIG. 6 is a partial plan view taken along the line VI—VI of FIG. 5, FIG. 7 is a right side view corresponding to FIG. 4.

DETAILED DESCRIPTION OF PREFERRED EMBODIMENTS

Figure 1:
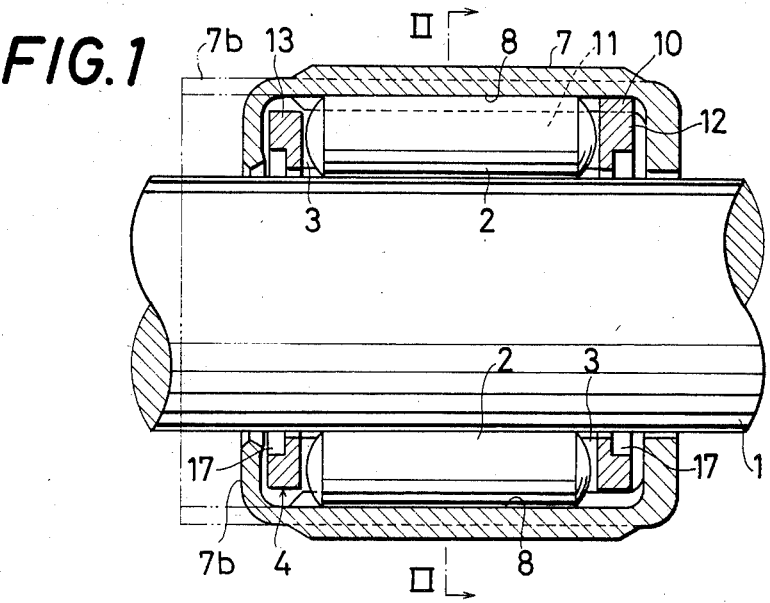
FIG. 1 is a view in longitudinal section of an overrunning roller clutch in service state.
Figure 2:
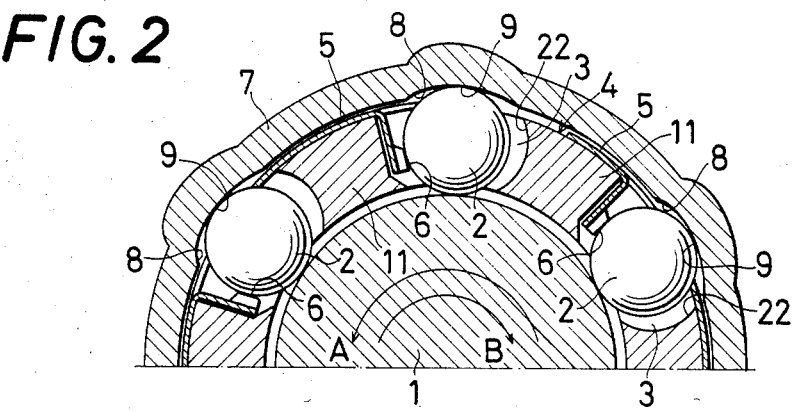
FIG. 2 is an enlarged cross-sectional view of the upper half thereof taken along the line II—II of FIG. 1.

FIGS. 1 and 2 show an overrunning roller clutch applied to a rotary shaft 1. A plurality of rollers 2 radially in contact with the rotary shaft 1 are retained in the respective pockets 3 provided in a cage 4. Each roller 2 in the pocket 3 is urged against its wall in one direction by a spring tongue 6 of a spring element 5 positioned in the pocket 3. The inner periphery of an outer race 7 set radially outside thereof and inside of a machine has formed therein a concavity 8 having a camming surface 9 corresponding to each roller. When the rotating direction of the rotary shaft 1 is as indicated by the arrow A, the shaft 1 rotates within the outer race 7 to play its role without being gripped by the rollers 2. When it is reversed to rotate in the direction indicated by the arrow B, however, the rollers 2 act as sort of wedges between the peripheral face of the rotary shaft 1 and the individual camming surfaces 9 so as to cause the outer race 7 to rotate integrally with the shaft 1. The cage 4 and the outer race 7 are allowed for small relative displacement in the direction of rotation through engagement of at least one convexity 10 in the outer periphery of the cage 4 in one of the concavities 8 in the outer race 7.

The cage 4 is composed of column portions 11 same in number with the rollers 2, arranged radially, equally spaced and extending parallel to the axis of the cage and annular portions 12 and 13 connecting them at both ends thereof. It will now be understood that each roller pocket 3 is formed by the column portions 11 and the annular portion 12 and 13. The above-mentioned convexity 10 is formed in the preferred embodiment in the outer periphery of the annular portion 12.

Figure 3:
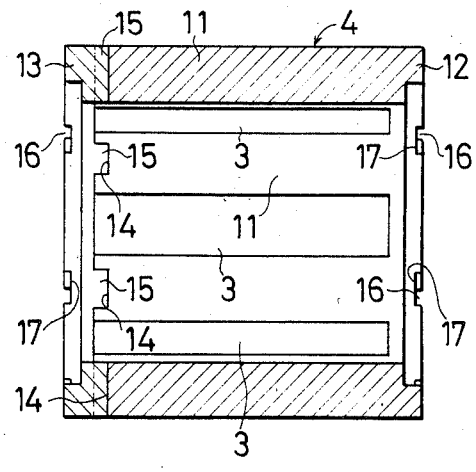
FIG. 3 is a front view in section of a cage.
Figure 8:
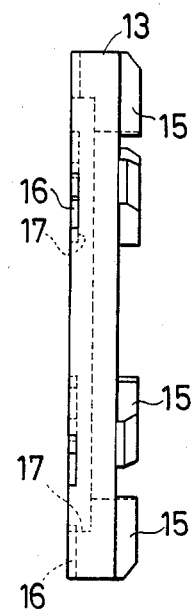
FIG. 8 is a front view of an annular member molded separately.
Figure 9:
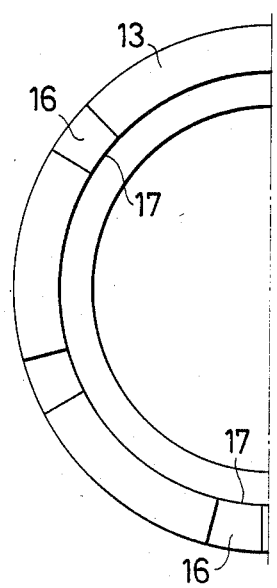
FIG. 9 is a left side view thereof.
Figure 10:
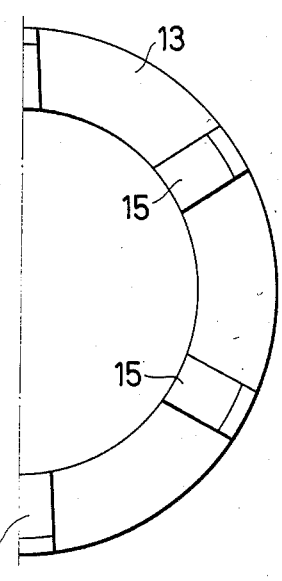
FIG. 10 is a right side view thereof.

The manufacturing method for the cage 4 is described below. The column portions 11 and annular portion 12 are molded integrally of a synthetic resin material such as nylon or polyacetal as shown in FIG. 3 or FIG. 7. The other annular portion 13 is molded separately. The end of each column portion 11, which is to be joined with the annular portion 13, has a recess 14 or radial groove formed therein as shown in FIG. 5. The end face of the annular portion 13 opposed to the end of each column portion 11 has formed therein a projection 15 for engagement in the recess or groove 14. It will be understood that the column portions 11 and the annular portion 13 are joined through engagement of the recesses 14 and the projections 15.

As a modified embodiment it is also possible to mold the column portions 11 and annular portion 12 separately and join these later on, but for upkeeping the required dimensional precision of the pocket 3, it is more advantageous to mold the column portions 11 and annular portion 12 integrally. When it is possible to dimension the thickness of the annular portion 13 sufficiently large, it is also possible to provide the projection 15 in the end face of each column portion 11 and have the mating recess 14 formed in the annular portion 13. The recesses 14 and the projections 15 need not necessarily be formed radially. When the cage 4 is to be molded of a synthetic resin material as described above, it is advisable to form the recess 15 as a groove as shown in FIG. 6, fit the projection 15 of the annular portion 13 in it and join both by ultrasonic welding with the annular portion 13 being pressed against the column portion 11. The work of joining these portions is feasible much easier and securer to be better suited for mass production. The joining method is, however, not limited to ultrasonic welding, and other method such as adhesive-bonding may as well be used.

The end face of the annular portion 12 as well as 13 has formed therein a plurality of radial grooves 16 and the inner periphery thereof has an annular stepped recess 17 therein. The depth of the annular stepped recess 17 from the end face of the annular portion is more than the depth of the groove 16. These groove 16 and annular stepped recess 17 are used to retain L-shaped lugs 18 at both ends of the spring element 5 described below.

As seen from FIGS. 11 through 14, the spring element 5 has a plurality of segments of spring formed along the outer periphery of the cage 4, these corresponding to equally divided segments of the periphery. The divided segments of spring 5 are respectively let into the roller pockets 3 of the cage 4 as illustrated in FIG. 2, each forming at least one tongue 6 for urging the roller 2 in one direction. There are provided two of the spring element 5 in the embodiment illustrated, but they may as well be three.

Each spring element 5 has formed a pair of lugs 18 at both ends thereof corresponding to both ends of the cage 4 including the annular portions, these lugs 18 are bent to fit in the grooves 16 at both ends of the cage 4 and the spring elements 5 are tightly assembled with the cage 4 by further bending the above-mentioned lugs to fit in the annular stepped recess 17.

Figure 14:
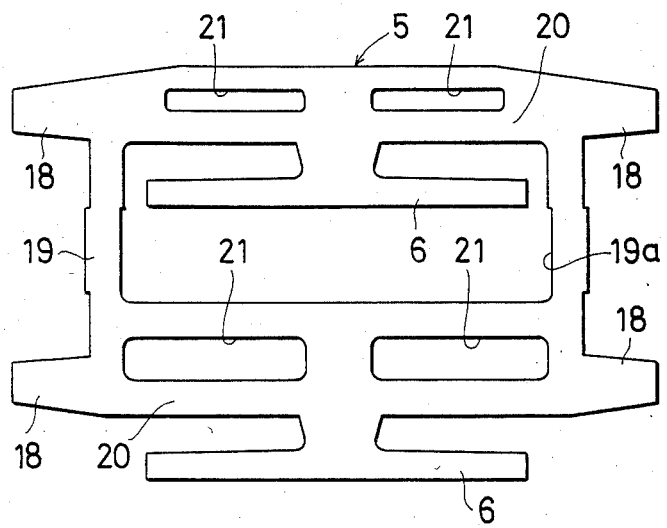
FIG. 14 is a developed plan view thereof.

The above-mentioned spring element 5 is made of sheet material such as phosphor bronze, beryllium bronze or stainless steel by stamping in a developed form as illustrated in FIG. 14. The stamped spring element shown in FIG. 14 has two spring tongues 6, 4 lugs 18, window aperture 19a corresponding to the aperture of the roller pocket 3 of the cage 4 and frame 19. Another frame 20 along the axis of the cage 4, i.e. along the outside of the column portion 11 of the cage 4 has stamped therein slots 21. These slots 21 serve to lower the resiliency of the frame 20 so as to prevent the cage 4 from being pushed by the spring element 5 in the radial direction as it is assembled with the cage 4 so that the spring tongue 6 can be accurately positioned in place in each roller pocket 3.

Figure 11:
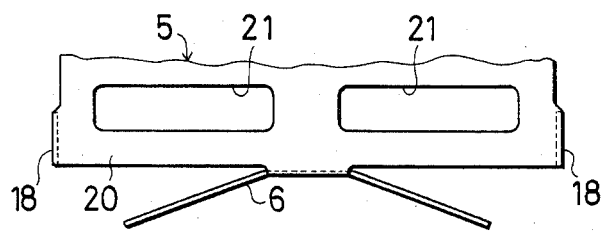
FIG. 11 is a plan view of a spring element.
Figure 15:
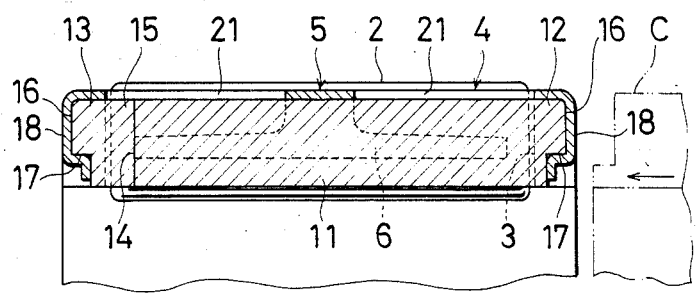
FIG. 15 is a sectional view showing the way the spring element is attached to the cage.

The work of assembling the flat stamped sheet as illustrated in FIG. 14 with the cage 4 as spring element 5 consists in first bending each spring tongue 6 at roughly the right angle, i.e. radially inward, for letting it into each roller pocket 3, then bending the wing portions of the spring tongue 6 in the direction in which the roller is to be urged as shown in FIG. 11 and thereafter bending each lug 18 along the groove 16 at each end of the cage 4. Next, the spring element 5 so prepared is assembled into the cage 4 from outside as illustrated in FIG. 2, and finally the lug 18 is bent into the annular stepped recess 17 by the use of the pressing-in jig C shown in FIG. 15 by imaginary line, and the assembly of the spring element 5 with the cage 4 is now over.

Then, described below is the method of manufacturing a synthetic resin molding in which the column portions 11 of the cage 4 are integral with the annular portion 12. This integral molding of the column portions 11 and annular portion 12 can be obtained by injecting a synthetic resin compound into a mold consisting of a female mold having in its bottom the molding face for the radial grooves 14 in the outer end faces of the annular portions and with its inner periphery forming the molding face for the outer peripheral face of the cage 4 and a male mold having in its bottom the molding face for the recesses 14 in the end faces of the column portions 11 and the molding face for the inner periphery and column portions 11 of the cage 4 coupled together axially. The annular portion 13 to be joined with the column portions 11 is to be molded separately by the use of a separate mold and, as already described above, these molded parts are to be assembled through fitting of the projections 15 in the mating recesses 14 and integrated by ultrasonic welding or the like.

Figure 13:
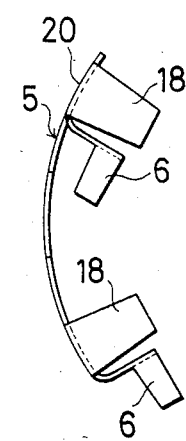
FIG. 13 is a side view of thereof.
Figure 12:
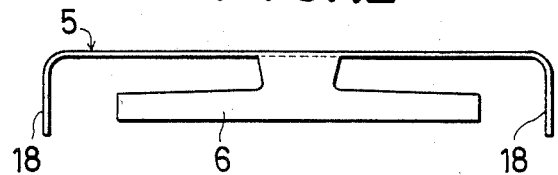
FIG. 12 is a front view thereof.

As mentioned above, the spring element 5 having the required number of tongues 6 is stamped out of an elastic sheet material, worked into the form as illustrated in FIGS. 11 through 13 and is then assembled with the cage 4. This assembling work, of the spring elements 5 with the cage 4, can as well be made manually by having the tips of the lugs 18 for fixing bent slightly inward in advance and then pushing these lugs 18 into the grooves 16 with a slight expanding urge and then causing the tips of the lugs 18 engaged in the stepped recess 17.

Effect

The present invention, being as described above in detail, has the following technical features or effects.

(a) Since the column portions molded integral with one annular portion are joined with separately molded, the other annular member through fitting of the projections formed in the end face of one member into the recesses formed in the end face of the other member, slight twisting or deviation off center of the column portion etc. caused in the course of molding of the individual parts can well be compensated for so that the precision of the cage as well as roller pockets can be markedly improved.

While, when the annular member joined with the column portions is provided with recesses for positioning the column portions, the depth of the recesses is limited by the thickness of the annular member, this limitation is overcome when these recesses are provided in the end faces of the column portions, hence increased is the mechanical strength of the cage as well as the degree of freedom of design and improved is the structural precision of the cage.

(b) Since the column portions of the cage and the annular portion integral therewith can be molded with a pair of male and female molds combined axially, the concavity 22 which is required on one side in the inner wall of the roller pocket 3 as shown in FIG. 2 can be easily provided in one side face of each column portion, this being advantageous when injection molding method is used.

By this enabled is proper retention of the rollers 2 in the respective pockets as well as securing the required accuracy of the running posture of the rollers. When, as mentioned above, the concavity 22 is formed on one side in the inner wall of the roller pocket 3, it is possible to hold the roller 2 in each pocket 3 urged against the concavity 22 by the spring tongue 6 by first assembling the spring element 5 into the cage 4 and subsequently setting the roller 2 therein. Since, the cage 4 can then be inserted into the outer race 7 after being assembled with each spring element 5 and roller 2, there is provided a merit of markedly facilitating and also automatizing the assembly of overrunning roller clutch. As seen from FIG. 1, the cage-spring element-roller assembly is to be inserted into the outer race 7, which, with a flange 7a at one end thereof preformed, has the other end thereof extended to a receiving cylindrical opening 7b as indicated by imaginary line, and then the cylindrical opening 7b is to be reduced centripetally to form the other checking flange 7b.

(c) The mounting precision of the spring element 5 with respect to the cage is of particular importance for proper adjustment of the urge to be given to each roller for the required working precision of overrunning roller clutch. The present invention, in which the spring element 5 is divided into a plurality of units or segments along the periphery of the cage 4, the spring element, segments thereof, can be inserted into each roller pocket with ease as it is assembled with the cage 4.

Hence, the troublesome working such as coiling a strip-like spring element round the cage 4 and then bending portions thereof into the individual roller pockets 3 is no longer necessary. So, according to the present invention, it is not only possible to fully automatize the work of assembling the spring elements with the cage by means of the automatic assembler but also possible to facilitate the work with simultaneous improvement of working precision even when it has to be done manually.

A further advantage of the present invention by the use of segmented plate spring element 5 is that this spring element is applicable even to cages for different numbers of rollers if only the roller dimensions and the arranging pitch thereof are the same. Still another advantage is that the assembling precision can further be improved and automatic assembling can further be facilitated by doing assembly of the cage with the spring element at both ends of the cage. The work of forming the spring tongues of the spring element 5 is relatively simple, and it is also advantageous that proper adjusting of the spring-urging force is feasible through the possibility of freely designing it in any desired shape as well as dimensions.

Thus, according to the present invention, it is possible to mold and assemble small or even midget parts without increased working difficulty so that it is now feasible thereby to provide overrunning roller clutches improved in performance and/or sizably reduced in size.

What is claimed is:

1. An overrunning roller clutch comprising rollers each thereof retained in a roller pocket of a cage formed by column portions and annular portions at both ends of the column portions, spring elements assembled with said cage for urging said rollers against corresponding camming surfaces provided in an outer race and an engaging means for engaging said outer race with said cage in the direction of rotation, wherein at least one annular portion of said cage is formed separate from its column portions, there are provided mating projections and recesses in the end faces of said column portions and that of said annular portion to be joined thereto, said projections are fitted in said mating recesses for joining said column portions with said annular portions to form said cage having said roller pockets therein, there are provided a plurality of radial grooves in said ends of said cage and bent lugs provided at both ends of each spring element are engaged in said groove to thereby secure said spring elements to said cage.

2. An overrunning roller clutch as recited in claim 1, wherein a recess is formed in the end of each column portion and a mating projection in the opposing end face of said separate annular member.

3. An overrunning roller clutch as recited in claim 1, wherein said recesses and projections are formed in radial directions.

4. An overrunning roller clutch as recited in claim 1, wherein said column portions and said annular portions are molded of synthetic resin, one of said annular portions and a plurality of said column portions being molded integrally and the other of said annular portions being molded separately.

5. An overrunning roller clutch as recited in claim 4, wherein said separately molded annular member is joined with the mating ends of said column portions by ultrasonic welding.

6. An overrunning roller clutch comprising a plurality of cages formed by a column portion and an annular portion at both ends thereof which cages define roller pockets each adapted to retain a roller, spring elements divided into a plurality of units or segments along the periphery of each cage, wherein in each divided unit of spring element at least one piece of spring is formed for urging said roller, lugs are formed to project at both ends, said pieces of spring are inserted into said individual roller pockets of each said cage, said spring element positioned at the outer periphery of each said cage, and said lugs are bent into radial grooves in both ends of each said cage.

7. An overrunning roller clutch as recited in claim 6, wherein a stepped recess portion is formed along a periphery of each said cage inward of said radial grooves in both ends thereof and the tips of said lugs are bent into said stepped recess for engagement therein.

8. An overrunning roller clutch as recited in claim 6, wherein said spring element is press-formed from an elastic sheeting.

9. An overrunning roller clutch as recited in claim 6, wherein slots are provided in frame portions of the spring element adjacent said column portions of said cage.

10. An overrunning roller clutch as recited in claim 6, wherein said spring element is fitted along the external cylindrical face of said cage.

* * * * *